July 4, 1950 — G. A. SPENCER ET AL — 2,514,189
METHOD AND APPARATUS FOR MAKING FINE FILAMENTS
Filed Nov. 16, 1946
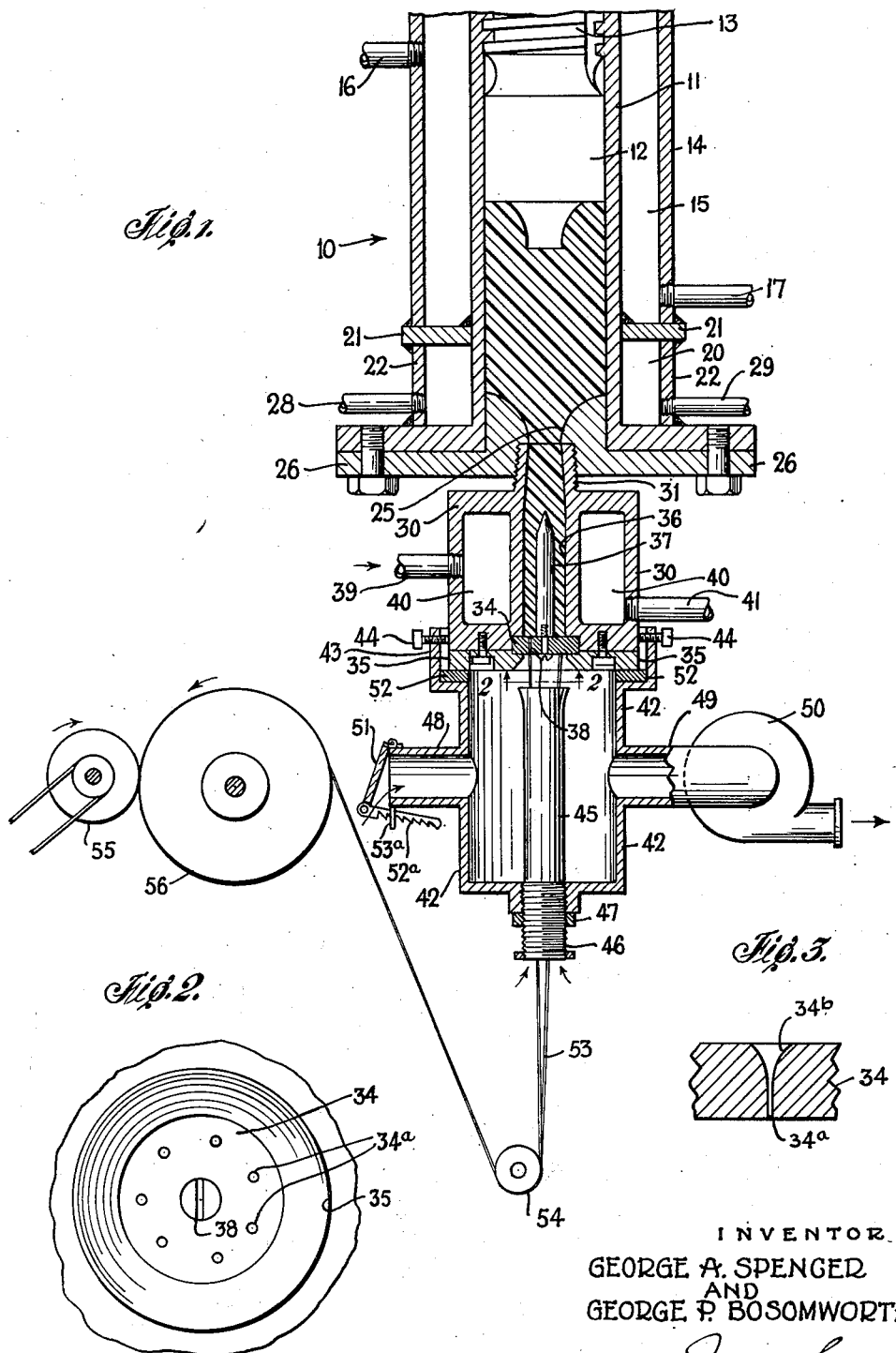
INVENTOR.
GEORGE A. SPENCER
AND
GEORGE P. BOSOMWORTH
BY Ely & Frye
ATTORNEYS Patented July 4, 1950

2,514,189

UNITED STATES PATENT OFFICE 2,514,189

METHOD AND APPARATUS FOR MAKING FINE FILAMENTS

George A. Spencer and George P. Bosomworth, Akron, Ohio, assignors to The Firestone Tire & Rubber Company, Akron, Ohio, a corporation of Ohio Application November 16, 1946, Serial No. 710,344

3 Claims. (Cl. 18—8)

This invention relates to methods and apparatus for forming fine filaments from synthetic fiber forming materials, especially to the formation of filaments having a diameter of approximately 0.003 of an inch or less from filament-forming, crystalline, thermoplastic materials, such as the vinylidene chloride resins, or 2,3-dichlorobutadiene-1,3 resins.

Heretofore filament extrusion of thermoplastic resins, such as vinylidene chloride resins, has been restricted almost wholly to the production of coarse filaments of approximately .008" or greater in diameter, such as are used in furniture or automobile seat covers, screening, novelties in ladies' wearing apparel, etc. However, the inability of filaments made from these resins to withstand fire, moisture, acid, fungus and surface deterioration, and to retain their original luster and color over long periods have established such resins as desirable materials for many uses. Therefore, the production of fine filaments from such resins is greatly desired so that fabrics, which have the above desirable properties, can be produced.

The extrusion of filaments sufficiently low in denier to serve for weaving into fine fabrics presented many problems which were not troublesome in the production of coarse filaments. For example, a polymerized 85-95% vinylidene chloride 15-5% vinyl chloride resin having small amounts of compounding ingredients therein, and that is sold under the tradename "Velon" by The Firestone Tire and Rubber Company, must be more fluid at the point of extrusion when extruding fine filaments, than if coarse filaments were to be produced. This resin becomes less viscous with increases in temperature but as appreciable fluidity is obtained, decomposition of the resin may occur, which decomposition produces carbon particles, bubbles of gas and other decomposition products which weaken, discolor and/or rupture the filaments. Another problem aggravated by the production of fine filaments is that of the mechanical support and orientation of the filament as it is formed.

The general object of the present invention is to avoid and overcome the foregoing and other disadvantages of and problems attendant the production of fine resinous filaments and to provide methods and apparatus for producing fine filaments from heat-sensitive, fiber-forming, thermoplastic materials.

Another object of the invention is to provide a method and apparatus for producing fine filaments characterized by freedom from breakage of the filament during its extrusion, cooling and orientation.

Another object of the invention is to distribute the extrusion material so as to have a constant volume of flow.

A further object of the invention is to control the cooling rate of extruded filaments so as to obtain the desired physical properties therein and size thereof.

Yet another object of the invention is to provide a variety of temperature zones in an extruder to adapt it for extrusion of a crystalline resin without chemical breakdown thereof.

Still another object of the invention is to provide an inexpensive, easily regulated, uncomplicated method and apparatus for the formation of oriented, crystalline resin filaments.

A further object of the invention is to treat a moving material so as to prepare it for its extrusion in a uniform manner and to heat such material rapidly to extrusion temperature.

More particularly, it is an object of the invention to form high strength filaments of 0.003 of an inch in diameter or less from crystalline resins, which filaments are suitable for weaving into fabrics.

Another object of the invention is to provide a die which is adapted to produce continuous fine filaments.

Other objects and advantages of the invention will be made apparent as the specification proceeds.

In the accompanying drawings, Fig. 1 is a longitudinal vertical section of a filament extruding apparatus embodying the principles of the invention;

Fig. 2 is a fragmentary section on line 2—2 of Fig. 1; and

Fig. 3 is an enlarged fragmentary section of the die.

Referring in detail to the drawings, a filament forming apparatus 10 is shown and it includes a cylinder 11 which is provided for receiving the filament forming resin either in the solid rod form, or as a powder, as desired, and for transmitting the resin to an extrusion die. Extrusion pressure is provided in the cylinder 11 by the plunger 12 which is shown as formed integral with a square threaded push rod 13 that engages with suitable means (not shown) for driving the plunger 12 axially of the cylinder 11. The extrusion pressure may be as high as about 2000 pounds per square inch. The cylinder 11 is surrounded by a gas tight jacket 14 and, to control the temperature of the extruded resin, the upper portion of the space enclosed between the cylinder 11 and the jacket 14 comprises a pre-heat zone and it receives steam through inlet 16 at low pressure. For example, a pressure of approximately ten pounds per square inch was used when extruding the aforementioned Firestone Velon resin and this steam should be from about 240° to 290° F. in temperature. This jacket 14 extends rearwardly of the cylinder, enclosing completely the length of the exterior area of the cylinder 11. Outlet 17 provides a conduit for flow of condensate and other fluids from the jacket 14. However, it will be realized that the inlet 16 and outlet 17 may be placed at any desired positions on the jacket 14.

A second, or plasticizing, steam chamber 20 is formed by a partition 21 secured to and extending between the cylinder 11 and the jacket 22 adjacent the forward end thereof for use in heating the resin in the cylinder 11 to a higher temperature than that of the chamber 15. Thus the temperature of the resin in the cylinder 11 can be gradually increased to give the resin sufficient plasticity that it will flow readily through an orifice 25 provided in an extrusion head plate 26, which is suitably secured to the discharge, and usually lower, portion of the cylinder 11. The steam chamber 20 serves to heat the plate 26 as well as the lower part of cylinder 11. Steam is supplied to the chamber 20 through inlet 28 and exhausted through outlet 29, and such steam should be at about 45 pounds per square inch and between 285° and 320° F.

In order to support a die, the plate 26 is counterbored and tapped in axial alignment with the orifice 25 at its outer end to receive and engage with an annular exteriorly threaded portion 31 of a die holder housing 30. The housing 30 is an important feature of the invention and it is provided primarily to heat the resin to be extruded to a higher temperature than that contained in either of the steam chambers 15 or 20 so that the filament forming resin is subjected for only a short period to a temperature which causes the resin to become sufficiently liquid so as to be extruded into filaments 0.010 inch in diameter or less. It is necessary to carry out the final heating step of the unextruded resin quickly and under accurate control since many resins tend to decompose under sustained or excessive heating at temperatures in the range at which they become liquid. Drawing the filaments while plastic and elongating them after cooling will function to reduce the filaments to their ultimate size, as explained hereinafter.

A multi-aperture extrusion die 34 is secured to the housing 30 by an apertured plate or fitting 35 which positions the die 34 within a recess drilled in the outer surface of the housing 30 and in axial alignment with the housing 30 which, as shown, has a resin conducting tube or bore 36 in the central portion thereof. The die 34 has a plurality of circumferentially evenly spaced die openings 34a formed in the radially outer section thereof. An important feature of the die of the invention is that the die openings 34a have tapered inner ends 34b and sharp outer ends, as shown. These die openings facilitate the production of continuous filaments by the die 34. Extrusion die 34 is aligned with the tube 36 and has attached thereto a projectile-shaped mandrel member 37 which extends into the tube 36 so that its axis exactly coincides with that of the tube 36. The member 37 may be fastened to the extrusion die 34 by any suitable means, such as a screw 38, or it may be formed integrally with the die 34. In all events, the member 37 forms a thin walled tubular passage, which may be as low as $1/64$ inch in thickness, in the tube 36 for the resin being extruded, and this construction facilitates rapid and uniform heat transfer to the material which flows through the tube 36 since heat is transmitted to such material from both its inner and its outer surfaces. It has been discovered that heat is transferred to the plastic up to three and one half times as fast when the member 37 is used in relation to when the member 37 is omitted. Corresponding increases in the extrusion rate were also made when the member 37 was used. The member 37 is approximately coextensive with a steam chamber 40. Steam under about 90 to 145 pounds per square inch is admitted to chamber 40, formed in the housing 30, by an inlet conduit 39 and exhausted by an outlet conduit 41. This steam should be at a temperature of from about 330 to 360° F.

A primary feature of the invention is that of controlling the air temperature, direction of air flow, and air pressure adjacent the outer end of the die 34. To this end, a housing 42, having an enlarged end 43 that telescopes over the end of the die support housing 30, is provided and is removably secured to the housing 30 by cap screws 44. The housing 42 has an axially positioned tube 45 adjustably engaged with its outer end by a threaded section 46 formed on the tube and a lock nut 47 is used for fixing the tube 45 in a given position. The inner end of the tube 45 extends to a point adjacent the die 34 and it receives the filament issuing from the die, with the specific relative position of the inner tube end and the die being adjustable by changing the engagement of the threaded section 46 with the housing 42.

In order to control air flow in the tube 45, an inlet tube 48 and an outlet tube 49 are provided on the housing 43 and a suitable suction pump 50 connects to the tube 49 for drawing air through the housing. A cover plate 51 is pivotably secured to the end of the tube 48 and a ratchet bar 52a is carried by the plate and engages by gravity or other means with a lock bar 53a on the tube 48 for controlling the position of the plate 51 so that the flow of air through the housing and the tube 45 can be partly regulated by the cover 51.

A washer 52 of heat resistant material, such as asbestos, is inserted within the enlarged end 43 of the housing 42 and it forms a heat barrier between the plate 35 and the housing 42. As only a slow current of air is drawn through the tube 45, it is found desirable to avoid appreciable heating of the housing 42, since it would lose heat to the tube 45, and the washer 52 aids in keeping the housing 42 at a proper temperature.

Pressure on the resin in the tube 36 forces it to flow smoothly from the tube through the holes 34a in the die to form a plurality of continuous filaments 53 which are led through the tube 45 for cooling.

Air flows from the atmosphere into the tube 45 at its outer end and travels upwardly or inwardly counter-current to the direction in which the filaments 53 are traveling as they leave the extrusion die. The velocity at which air travels along tube 45 is quite important to the success of the invention since the filament solidification conditions as they pass through the tube 45 for later elongation and orientation, as will be hereinafter explained more fully, are critical. A slight change in air velocity or an appreciable change in room temperature will result in considerable change in the structure of the filament so that its breakage point and tensile strength are dependent upon the conditions of formation and cooling.

The denier of the finished filament is dependent upon the extrusion rate in units of weight or volume per unit of time, the degree of drawing while still plastic from heat imparted to the filament by the extrusion process, and the degree of elongation imparted to the cooled filament. The extrusion rate is governed by the movement of the plunger 12, and of course, the number and size of openings in the die 34. Extrusion rates of approximately 0.15 to 1.0 cubic inches per minute is the range from which fine filaments have been obtained from the die 34 by the present invention, although the invention is by no necessity limited thereto. The degree of elongation achieved, while the filaments are plastic, is determined by the difference in the peripheral velocity of a driven roll 54, suitably positioned adjacent the outer end of the housing 42, and the linear rate at which the filaments 53 are leaving the extrusion die 34.

The cooling of the filaments 53 is important because they must be supercooled and be solidified in amorphous form to achieve the benefits of the following treatment. The percentage of elongation of the cooled filaments will depend upon that elongation required for complete molecular orientation of the crystals in the filaments of a particular resin. Molecular orientation as applied to a synthetic fiber usually is achieved by tensioning solid filaments to produce a permanent elongation and it effects a crystallization of the filaments, plus arranging such crystals in a uniformly axially directed manner. Complete orientation by stretching is obtained when an elongation has been reached at which the filament suddenly becomes substantially unyielding. With the application of vastly more tension, the synthetic filament or fiber may be broken, but not appreciably elongated. It is not uncommon to increase the tensile strength of vinylidene chloride-type filaments by 500% by molecular orientation by practicing the present invention. Orientated Firestone Velon filament requires approximately 350 per cent elongation to bring out its best tensile strength normally obtainable, which is in the range of 36,000 to 40,000 pounds per square inch.

Elongation is ordinarily accomplished by stretching the filaments after they move past the roll 54. To this end, the filaments pass to rolls 55 and 56 and are received on roll 56. The rolls 55 and 56 are suitably positioned, with roll 55 being driven in a conventional manner and bearing on the surface of roll 56 on which the filaments are received. This obtains uniform tension and elongation of the filaments as they accumulate on and increase the outer diameter of the roll 56, as the R. P. M. of the wind-up roll 56 must be automatically compensated to maintain constant peripheral speed for the roll 56.

Firestone "Velon" has been formed into a filament 0.003 of an inch in diameter according to this invention by extruding filament at the rate of 0.11 cubic inch of solid resin per minute per filament. The filaments 53 are usually elongated approximately 150 per cent while passing to the roll 54 and then elongated, from their original length, about 200 per cent more in passing from the roll 54 to the roll 56. The roll 54 may have a speed of about 590 feet per minute while the wind-up spool may operate at about 940 feet per minute.

Successful extrusion of a Firestone "Velon" filament has been regularly obtained when the temperature of the air entering the tube 45 and the housing 42 through the inlet tube 48 was approximately 84° F. and the air velocity through tube 45 was approximately one and one half feet per minute. It seems that, if the air flow speed is too great in the tube 45, the filaments 53 become lumpy whereas insufficient air flow speed is indicated by filament breakage at the die. With air temperatures of 95° F. and higher, appreciable filament breakage occurred. The air in the tube 45 was substantially static and only flowed sufficiently to maintain uniform cooling conditions for the filaments.

It has been stated that hereinbefore constant temperature conditions should exist for the newly formed elements, and the housing 42 is provided to aid in achieving this result. In some instances, the housing 42 may be made of such size as to enclose the tension and orientation means, such as the rolls 54 and 56, whereby the entire temperature conditions for the filaments, as they are solidified and then stretched to their oriented condition, can be readily controlled and retained constant. In other instances, the temperatures in the housing 42 would not be uniform throughout the housing but there would be uniform, or standard temperature conditions at any given place at all times. Substantially static air in the pre-orientation tube 45 and housing 42 is one effective way of securing the desired uniformity.

Die openings of .016 inch have been used and filaments of less than .001 inch have been formed from such sized die openings. The die opening should be about ten to twenty times the size of the filament to be produced.

Usually the apparatus of the invention will be vertically positioned as this seems to aid in the drawing of the filaments as they issue from the die. Since the resin comprising the filaments is quite hot and thus of low viscosity as it issued from the die, the filaments are hot stretched an appreciable amount before they solidify. Hence the amount of cold stretch that the filaments receive before reaching the roll 54 is difficult to measure.

Small amounts of a plasticizer, stabilizer, pigment or other compounding ingredients are usually mixed with the thermoplastic material before it is extruded. In addition to the specific material named, the apparatus shown may be used with polymers of vinylidene chloride, and 2,3-dichlorobutadiene-1,3, that are resinous, crystalline and orientable. The invention also may be used with copolymers of relatively large quantities of dichlorobutadiene or vinylidene chloride with minor proportions of other unsaturated compounds such as the vinyl esters on the order of vinyl chloride, vinyl bromide, vinyl acetate, vinyl butyrate, vinyl stearate and the like; vinyl ethers and ketones, such as vinyl isobutyl ether and vinyl ethyl ketone; vinylidene chloride (for dichlorobutadiene); cyclic substituted unsaturated compounds such as styrene, indene, coumarone and the like; conjugated unsaturated compounds such as acrylonitrile, and the like. Dichlorobutadiene should be polymerized in the presence of modifiers such as 1 or 2% of amylmercaptan to avoid obtaining an insoluble and infusible product.

The drawings show that the filaments are handled as a unit in their processing and wind-up on the roll 56. Thereafter the filaments are usually unwound from the roll and twisted together to form a thread before they are woven or otherwise used.

The volume of the cylinder 11 must be correlated to the extrusion rate so that no material stays in the cylinder for an extended period and the material merely is heated to or about the temperature of the surrounding jacket or chamber, after which the material flows or is moved to the next chamber, or is extruded, as the case may be.

It will be realized that the temperatures set forth herein may be varied appreciably with variations in the materials being extruded. The specific temperatures set forth herein apply particularly well for the extrusion of resins of the nature of Velon. In heating the extrusion chamber, sufficiently high temperatures and slow extrusion speeds should be used so as to liquify the extruded material which is lying immediately adjacent the walls forming the extrusion chamber so that such liquified material may function, in effect, as a lubricant for the extrusion of the bulk of the material.

Of course, other heating media than steam may be used to heat the thermoplastic material when desired.

In forming the cylinder 11 and other extrusion apparatus of the invention it is necessary to use materials which are not attacked by the extruded material. Nickel or stainless steel have proven satisfactory for the extrusion of most vinyl resins.

In accordance with the patent statutes, one complete embodiment of the invention has been illustrated and described herein in detail. However, it will be understood that the scope of the invention is not limited to the example given herein, but that it is defined solely by the appended claims.

What is claimed is:

1. That method of forming fine filaments from a thermoplastic resin selected from the group consisting of crystalline polymers and copolymers of vinylidene chloride and of 2,3-dichlorobutadiene-1,3 comprising the steps of placing the material in a container, preheating the material to a temperature of between approximately 240–290° F., plasticizing the material for a short period at a temperature of between approximately 285–320° F., extruding the material into filaments at a temperature of between approximately 330–365° F., subjecting the extruded filaments to a counterflow of air at a temperature of approximately 84° F. and at a velocity of approximately 1½ feet per minute to cool the filaments, elongating the filaments approximately 150 percent while subjecting them to said counterflow of air, and still further elongating the filaments approximately 200 percent after the filaments have been cooled.

2. Apparatus for forming fine filaments from a thermoplastic material, which apparatus comprises a hollow container for the thermoplastic material, said container having a discharge end, means for setting up a pressure on the material in said container and forcing it toward the discharge end of said container, a plurality of separate heating chambers associated with the periphery of said container, said heating chambers being at a plurality of increasing temperatures from the feed to the discharge end of said container, an extrusion housing secured to the discharge end of said container, said housing having a bore adapted to receive material from said container, means for heating said housing to an elevated temperature, a die comprising a flat plate disposed transversely of said bore and secured to said housing at the outer end of its bore, a mandrel secured to the center of said die and extending into the bore of said housing to permit only a tubular portion of thermoplastic material to be in said housing's bore, said die being provided with perforations therethrough for the extrusion of said fine filaments in the areas between the mandrel and the points at which the die is secured to said bore, a cover chamber associated with the discharge face of said die, and means for generating and varying an air flow through said cover chamber in a direction axial of said bore and toward the discharge face of said die for controlling the cooling rate of newly formed filaments issuing from said die.

3. In apparatus for forming fine filaments from crystalline, extrudable resins, a cylindrical extrusion chamber having a discharge end, means for heating the periphery of said chamber, a die comprising a flat plate having filament-extruding perforations therethrough, said die being disposed transversely of and secured to the discharge end of said chamber, and a cylindrical projectile-shaped mandrel mounted centrally on said die, extending into said chamber, and having all its surfaces extending into said chamber bounded wholly by the space in said chamber and free from contact with the walls of said chamber so as to force material therein into relatively thin walled tubular shape adjacent said die.

GEORGE A. SPENCER.
GEORGE P. BOSOMWORTH.

REFERENCES CITED

The following references are of record in the file of this patent:

UNITED STATES PATENTS

| Number | Name | Date |
|---|---|---|
| 1,999,072 | Allen | Apr. 23, 1935 |
| 2,177,660 | Kimble et al. | Oct. 31, 1939 |
| 2,252,684 | Babcock | Aug. 19, 1941 |
| 2,257,104 | Burrows | Sept. 30, 1941 |
| 2,266,363 | Graves | Dec. 16, 1941 |
| 2,340,834 | Hanson | Feb. 1, 1944 |
| 2,384,772 | Wiley | May 16, 1944 |
| 2,367,691 | Roddy | Jan. 23, 1945 |
| 2,396,752 | Roddy | Mar. 19, 1946 |
| 2,403,476 | Berry et al. | July 9, 1946 |

Certificate of Correction

Patent No. 2,514,189                                                         July 4, 1950

GEORGE A. SPENCER ET AL.

It is hereby certified that error appears in the printed specification of the above numbered patent requiring correction as follows:

Column 8, line 59, list of references cited, for the patent number "2,384,772" read *2,348,772*; after line 62, insert the following reference:

2,303,338      Dreyfus et al. ------------------- Dec. 1, 1942 and that the said Letters Patent should be read as corrected above, so that the same may conform to the record of the case in the Patent Office.

Signed and sealed this 27th day of February, A. D. 1951.

[SEAL]

THOMAS F. MURPHY,
                                                     *Assistant Commissioner of Patents.*